Figure 3:
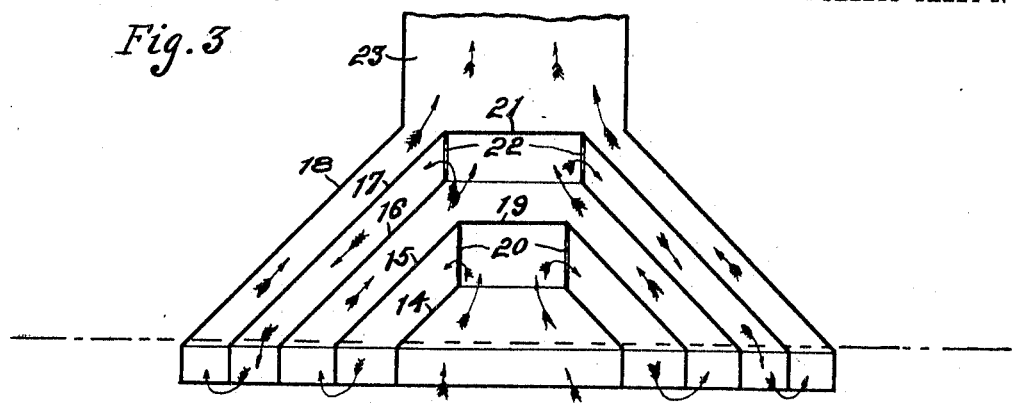

O. M. FOSTER.
GAS OR SMOKE WASHER.
APPLICATION FILED JULY 8, 1912.
1,096,501.
Patented May 12, 1914.
2 SHEETS—SHEET 1.
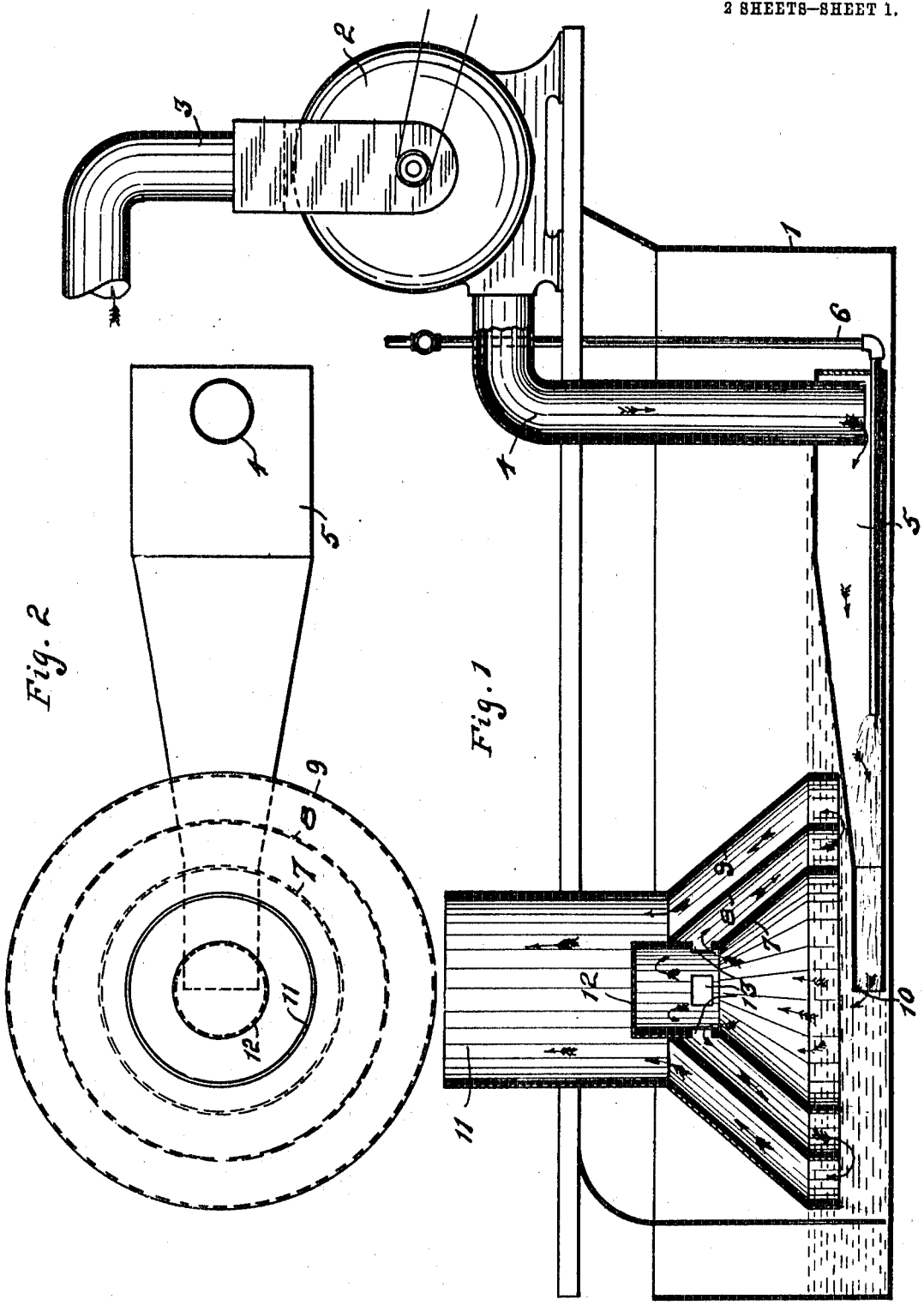
WITNESSES:
Julian H. Kendig.
Archworth Martin
INVENTOR.
O. M. Foster
BY
Paul Synnestvedt
ATTORNEY.

O. M. FOSTER.
GAS OR SMOKE WASHER.
APPLICATION FILED JULY 8, 1912.

1,096,501.

Patented May 12, 1914.

2 SHEETS—SHEET 2.

WITNESSES:
Julian H. Kendig.
Archworth Martin

INVENTOR.
O. M. Foster
BY
Paul Synnestvedt
ATTORNEY.

UNITED STATES PATENT OFFICE.

OLIVER M. FOSTER, OF ELKHART, INDIANA, ASSIGNOR TO AMERICAN SMOKE WASHING COMPANY, OF CLEVELAND, OHIO, A CORPORATION OF ILLINOIS.

GAS OR SMOKE WASHER.

1,096,501.  Specification of Letters Patent.  Patented May 12, 1914.

Application filed July 8, 1912. Serial No. 708,133.

*To all whom it may concern:*

Be it known that I, OLIVER M. FOSTER, a citizen of the United States, residing at Elkhart, in the county of Elkhart and State of Indiana, have invented certain new and useful Improvements in Gas or Smoke Washers, of which the following is a specification.

The invention relates to apparatus for removing smoke and other substances in the gaseous products of combustion from locomotive furnaces and the like. The invention has for its primary objects, the provision of a very compact apparatus whereby a repeated and thorough washing of the gas is secured, and the provision of a very cheap and simple apparatus capable of use as a supplemental washing means in connection with other primary washing means. Certain embodiments of the invention are illustrated in the accompanying drawings, wherein—

Figure 1 is a longitudinal section through apparatus embodying my invention; Fig. 2 is a partial plan view of the apparatus of Fig. 1, and Figs. 3, 4, and 5 are sectional diagrammatic views of modifications.

Referring to Figs. 1 and 2, 1 is a tank containing a body of liquid—preferably water; 2 is a fan for conveying the gas to be washed, from the pipe 3 to the pipe 4, which latter pipe discharges into a passageway 5 beneath the surface of the liquid in the tank; 6 is a steam pipe for supplying steam to the passageway 5 for agitating the liquid in the passageway and breaking up the bubbles of gas passing therethrough; 7, 8 and 9 are a series of conical hoods lying over the outlet 10 of the passageway 5, and 11 is the outlet stack.

Each of the hoods 7, 8 and 9 has its lower edge turned vertical as indicated in Fig. 1, and the level of the liquid is such that these edges lie below the surface of the liquid. The upper end of the hood 7 is provided with a chamber 12, and this chamber has a plurality of outlets 13 leading to the upper end of the hood 8. The path of the gases to be washed and the operation of the device will be quite clear from the arrows upon Figs. 1 and 2. The gas supplied from the pipe 4 first passes through the passageway 5 and is partially washed. The steam from the pipe 6 very materially assists in this washing, as the steam not only agitates the liquid and tends to break up the large bubbles of gas, but also assists in saturating the bodies of gas in the passageway, thus precipitating any solids which may be contained in the gas. After it is discharged from the outlet end 10 of the passageway the gas rises through the liquid into the hood 7; it then passes through the openings 13, is forced downward to the bottom edge of the hood, passes around the edge of the hood and through the liquid, and is then discharged through the hood 9 to the stack 11. It will be apparent that the arrangement of hoods 7, 8 and 9 provides a simple and an effective means for securing a repeated washing of the gas, and that this nested arrangement of hoods may be most conveniently applied in connection with the primary washing means including the passageway 5 provided with its steam supply 6.

There is, of course, a tendency of the gases rising from the outlet 10 to by-pass across to the space between the hoods 8 and 9 instead of following the course above described and indicated by the arrows in Fig. 1, but due to the agitation of the water and the uneven application of pressure downwards from the spaces between the hoods caused by such agitation after pressure has accumulated in such spaces, a part of the gases follow the path indicated by the arrows. The part of the gases which by-pass to the space between the hoods 8 and 9 also follow a comparatively long course through the water and the washing all in all is a thorough and effective one.

It will also be apparent that the number of hoods may be multiplied to suit conditions, and that by this multiplication still further washings of the gas may be had. The manner in which this idea may be carried out to secure further washings of the gas is illustrated in Fig. 3 wherein five nested hoods 14, 15, 16, 17, and 18 are provided, thus securing additional passages for the gas through the water. The first hood 14 is provided with the chamber 19 having the discharge openings 20, and the hood 16 is similarly provided with a chamber 21 having discharge openings 22. The outer hood 18 discharges to a stack 23.

Figure 4:
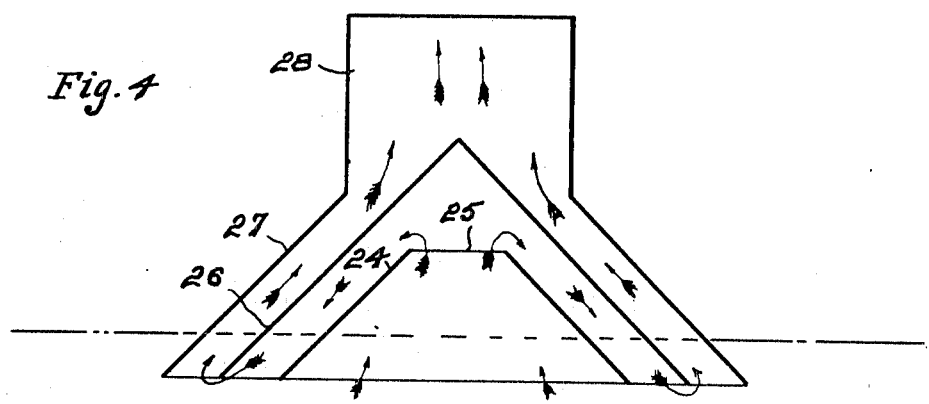

Figure 4 illustrates another modified arrangement of hoods. In this construction the inner hood 24 is merely cut off at the top in order to provide the outlet passage 25, and the second hood 26 is modified as indicated in the drawing. The outer hood 27 discharges to the stack 28, and the lower edges of the hoods are not turned vertical as in the construction Fig. 1.

Figure 5:
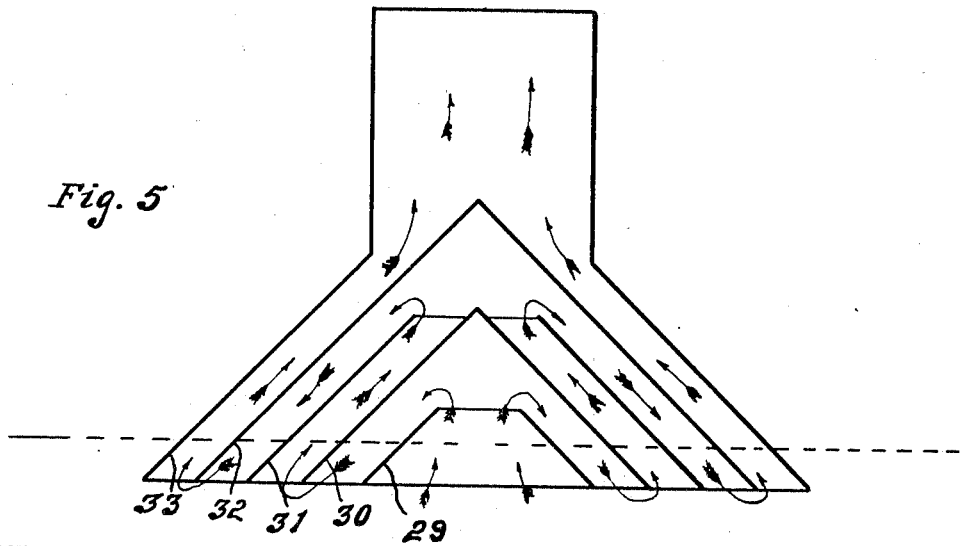

Figure 5 illustrates a modification of the arrangement shown in Fig. 4, but instead of the three hoods five hoods 29, 30, 31, 32 and 33 are provided, the construction in other respects resembling that of Fig. 4 but giving more washings of the gas.

Having thus described my invention and illustrated its use, what I claim as new and desire to secure by Letters Patent, is the following:

1. In combination in a gas washer, a body of liquid, a hood arranged to receive a discharge of gas to be washed and having its lower edge below the surface of the liquid and provided with an outlet above the surface of the liquid, a second hood closed at its upper end inclosing the first hood and having its lower edge below the surface of the liquid, and a third hood inclosing the second hood, such third hood having its edge below the surface of the liquid and having a discharge opening above the surface of the liquid.

2. In combination in a gas washer, a body of liquid, a conical head arranged to receive a discharge of gas to be washed and having its lower edge below the surface of the liquid, a second conical hood closed at its upper end inclosing the first hood and having its lower edge below the surface of the liquid, and a third conical hood inclosing the second hood, such third hood having its edge below the surface of the liquid and having a discharge opening above the surface of the liquid.

3. In combination in a gas washer, a body of liquid, a conical head arranged to receive a discharge of gas to be washed and having its lower edge turned vertically and lying below the surface of the liquid and having an outlet above the surface of the liquid, a second conical hood surrounding the first hood and having its edge turned vertically and lying below the surface of the liquid, and a third conical hood surrounding the second hood and having its edge turned vertically and lying below the surface of the liquid, such third hood having a discharge opening above the surface of the liquid.

4. In combination in a gas washer, a tank containing a liquid and having a smoke washing passage lying below the surface of the liquid, a hood over the outlet end of the said washing passage and having its lower edge below the surface of the liquid and provided with an outlet above the surface of the liquid, a second hood closed at its upper end inclosing the first hood and having its lower edge below the surface of the liquid, and a third hood inclosing the second hood, such third hood having its edge below the surface of the liquid and having a discharge opening above the surface of the liquid.

5. In combination in a smoke washer, an outlet stack, a body of liquid, and a plurality of nested hoods all having their lower edges in the liquid, and alternately being closed and having outlets at their upper ends, the inner hood having an outlet and being in position to receive a discharge of gas to be washed and the outer hood communicating with the said stack.

In testimony whereof I have hereunto signed my name in the presence of the two subscribed witnesses.

OLIVER M. FOSTER.

Witnesses:
F. W. TURNER,